March 29, 1927.

F. H. DOERR ET AL 1,622,423

PHONOGRAPH MECHANISM

Filed Sept. 27, 1922  7 Sheets-Sheet 1

Fig. 1

Witness

Inventors:
Fred H. Doerr
Gordon F. Roedding

March 29, 1927.

F. H. DOERR ET AL 1,622,423

PHONOGRAPH MECHANISM

Filed Sept. 27, 1922

Inventors:
Fred H. Doerr
Gordon E. Koedding
By Wilkinson Huxley Byron & Knight
Attys March 29, 1927.

F. H. DOERR ET AL

PHONOGRAPH MECHANISM

Filed Sept. 27. 1922

Inventors
Fred H. Doerr
Gordon E. Roedding

Patented Mar. 29, 1927.

1,622,423

UNITED STATES PATENT OFFICE.

FRED H. DOERR AND GORDON E. ROEDDING, OF GRAND RAPIDS, MICHIGAN, ASSIGNORS TO CHENEY TALKING MACHINE COMPANY, OF CHICAGO, ILLINOIS, A CORPORATION OF ILLINOIS.

PHONOGRAPH MECHANISM.

Application filed September 27, 1922. Serial No. 590,784.

This invention relates to a new and improved phonograph mechanism and more particularly to means adapted selectively to automatically stop the mechanism at the end of a record or to return the sound box to the outer edge of the record.

When playing records upon sound reproducing machines, it is ordinarily desirable to either stop the machine at the end of the record or to cause the machine to repeat the record. Devices have heretofore been designed for automatically stopping the machine, such as that disclosed in the aplication of Fred H. Doerr, Serial No. 557,415, filed April 29, 1922. Other devices have been designed adapted to cause the machine to repeat the record, but these devices are not automatically operated at the expiration of the record, but lift the stylus from the record at a predetermined point and replace it at a different predetermined point. It is consequently necessary to adjust these devices for different records. It is further essential for the preservation of both the record and the sound reproducing diaphragm that the stylus be placed gently upon the outer edge of the record.

It is an object of the present invention to provide mechanism for automatically stopping the operation of a sound reproducing machine when the stylus reaches the end of the record groove, the mechanism being adapted for use with either electrically or mechanically driven machines.

It is also an object to provide a mechanism of the class described adapted to be selectively adjusted to replace the stylus upon the outer edge of the record when the stylus reaches the inner end of the groove, and to move it inward until it reaches the outer end of the sound groove.

It is a further object to provide a mechanism of the class described adapted to automatically stop the operation of the machine when the sound box is moved and placed beyond the outer edge of the record.

It is an additional object to provide a repeating device adapted to automatically adjust the tone-arm travel to suit the record being played, the adjustment being controlled by the record.

Other and further objects will appear as the description proceeds.

We have illustrated a preferred embodiment of our invention in the accompanying drawings, in which.

Figure 1:
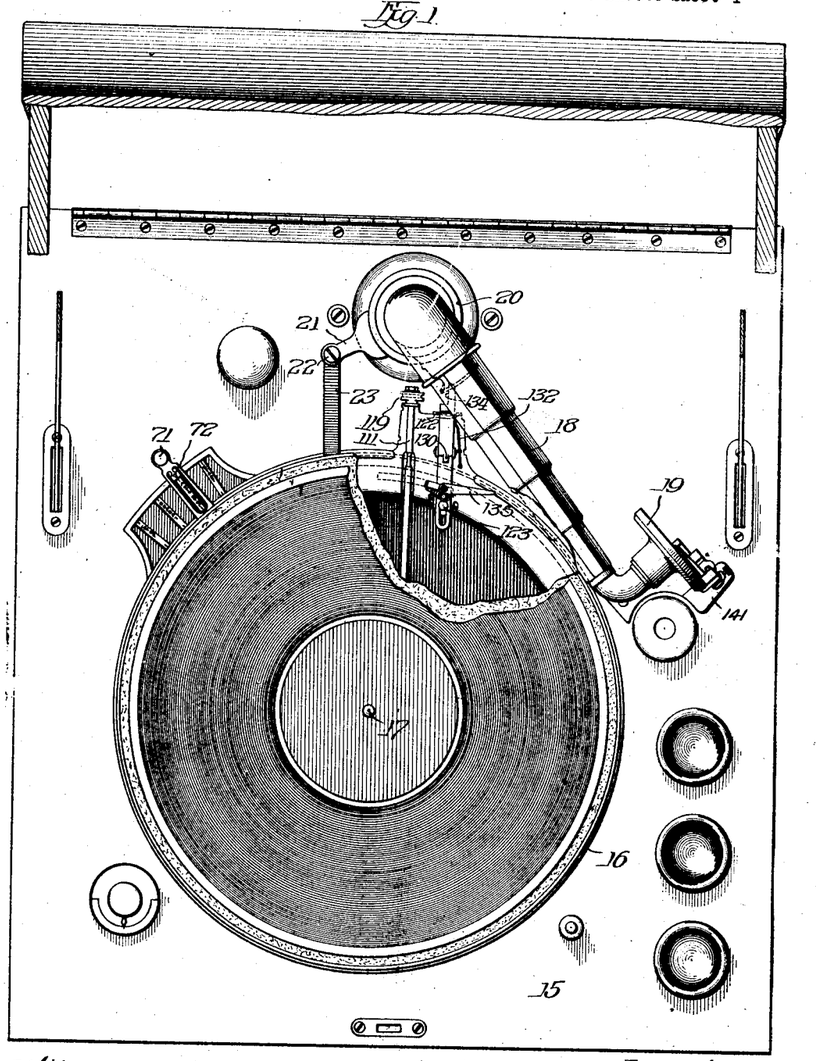
Figure 1 is a plan view of a phonograph equipped with our invention, the turn-table being partly broken away in order to better show a portion of the device.
Figure 3:
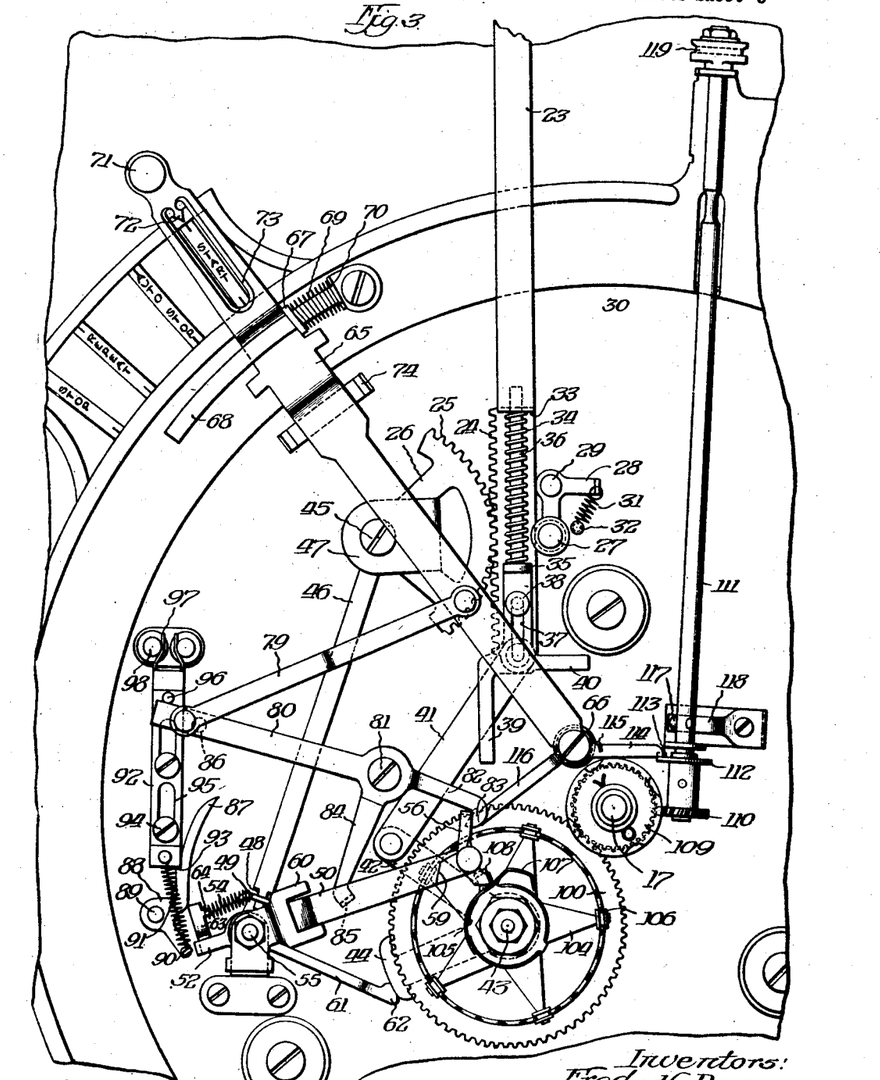
Figure 3 is a view with the turn-table removed, showing the mechanism in the start position.

In Figure 1 the device is shown applied to a phonograph of usual construction having the cabinet top 15 and turn-table 16, the latter being rotated by spindle 17. The tone-arm 18 carries the sound-box 19 and is provided with a downwardly extending portion having a limited swinging movement supported by the member 20. The tone-arm has connected thereto the radially extending member 21 which latter is connected by screw 22 to the operating bar 23. As best shown in Figure 3, this bar 23 is provided with teeth 24 meshing with teeth 25 carried by sector 26. The bar 23 is yieldably maintained in engagement with the sector 26 by means of the guide roller 27 carried by bell-crank 28 which latter is pivoted at 29 to the motor plate 30 of the machine. The tension spring 31 extends between the opposite arm of the bell-crank 28 and the stud 32, which latter is secured in the motor plate 30.

The bar 23 is downwardly offset at point 33 and the vertically extending offset portion has an opening cut therethrough to receive and guide the slide 36. The slide 36 is provided with an enlarged portion 35 and the spring 34 is fitted between the offset portion 33 and enlarged portion 35, the spring encircling the slide. The enlarged portion of the slide is provided with the slot 37 which engages the stud 38 carried by the bar 23 and permits the slide to have a limited sliding movement relative to the bar. The slide is further provided with the fingers 39 and 40, the purpose of which will be discussed in detail hereafter.

The inner end of the slide 23 is pivotally connected to the link 41, the opposite end of which is connected to the bell-crank lever 42. This bell-crank lever 42 is pivoted upon the stud 43 and the opposite arm of the bell-crank is provided with the cam surface 44.

Figure 10:
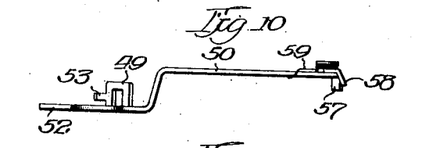
Figure 10 is a side view and Figure 11 a top view of the stop slide assembly.
Figure 11:
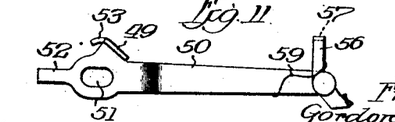

The sector 26 is pivoted upon the stud 45 carried by motor plate 30. The friction arm 46 is also carried by stud 45 and is frictionally held against the sector 26 by the spring 47. The free end of the friction arm 46 is reduced at 48 and fits into a slot in an upwardly extending portion 49 carried by the stop slide 50. The slide 50, as shown in detail in Figures 10 and 11, is provided with the elongated slot 51 and with the rear extension 52. It is further provided with the lug 53, which, as shown in Figure 3, receives one end of the compression spring 54. The slot 51 receives the stud 55 which latter is secured to the motor-board 30.

The free end of the slide 50 has pivoted thereto the stop lever 56. This lever, as best shown in Figures 10 and 11, is provided with the downwardly extending lugs 57 and 58. The spring 59 encircles the pivot of the lever 56 and its opposite ends engage the slide 50 and lever 56 in such manner as to yieldingly maintain the lever in the position in which it is shown in Figure 11.

The fork 60 is secured upon the stud 55 and serves to guide the sliding movement of the stop slide 50 and to limit its swinging movement about the stud 55. The lever 61 is pivoted upon stud 55 and is provided at one end with a portion 62 adapted to engage the cam 44 carried by bell-crank 42. The opposite end of this lever 61 is turned upwardly at 63 to laterally engage the rear end extension 52 of slide 50. Beyond the portion 63 the lever is provided with lug 64 engaging the spring 54.

The control lever 65 is pivoted upon stud 66 secured to the motor-board 30. This lever 65 is provided with the upwardly extending lug 67 which latter is pierced to permit passage of the arc 68. The spring 69 encircles the arc and fits between the portion 67 and the enlarged end 70 of the arc. The control lever is provided with the operating handle 71 and the indicating pointer 72, the latter extending into the reading slot 73. The spring 74 is secured to the control lever and engages the motor-board 30 thus thrusting the lever upwardly.

Figure 6:
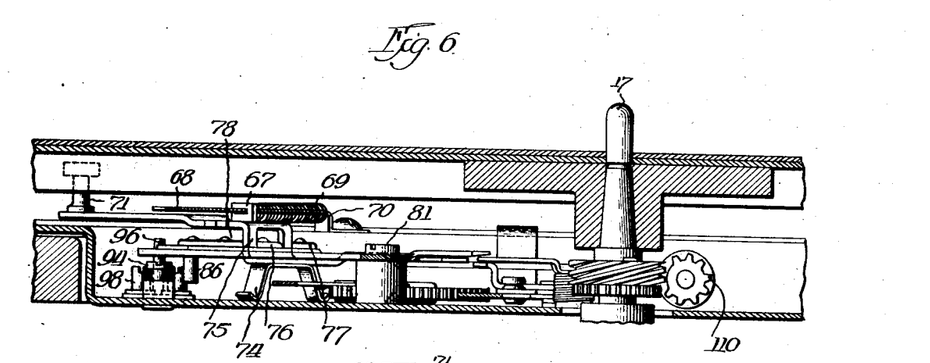
Figure 6 is a section taken on line 6—6 of Figure 4.

As best shown in Figure 6, the offset portion 75 of the lever is provided with a tongue 76 fitting in a guide slot 77 formed in the side of the motor plate. The upper edge of this slot 77 is formed with spaced notches 78, one of which is adapted to receive the tongue 76 when the lever is in any one of its four positions.

The control level is connected by link 79 with the lever 80 which latter is pivoted upon stud 81 carried by the motor-board. The arm 82 of the lever 80 is provided with the hook end 83 adapted to engage the downwardly extending lug 57 upon the stop lever 56. (See Fig. 10.) The arm 84 of the lever 80 is provided at its outer end with the downwardly extending portion 85. The lever 80 carries the downwardly extending stud 86 at a point adjacent its pivotal connection with the link 79.

The stud 86 is adapted to engage the arm 87 of the switch catch 88. The switch catch 88 is pivoted upon the stud 89 and is provided with the upwardly extending lug 90 to which is secured one end of the spring 91, the opposite end of which is connected to the switch slide 92. The switch catch 88 is provided with the notch 93 engaging the switch slide 92. The switch slide is guided in its motion by studs 94 fitting in slots 95. The slide is provided with the upwardly extending switch closing stud 96 adapted to be engaged by the outer end of the lever 80. The switch slide carries the switch blades 97 adapted to engage the switch contacts 98. It will be understood that the closing of the switch will close the circuit through any suitable electric motor (not shown) which serves to drive the turn-table spindle 17.

Figure 7:
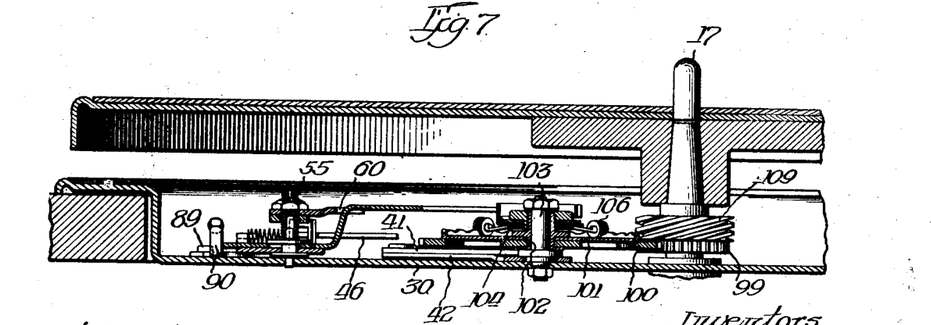
Figure 7 is a section taken on line 7—7 of Figure 4.

The turn-table spindle 17 carries the small gear 99 which engages the large gear 100. As best shown in Figure 7, the cam disk 101 is clamped against the gear 100 and the two are carried in fixed relation by the collar 102 which rotates freely upon the stud 103 carried by the motor plate 30. The resistance star 104 is rotatably mounted upon the stud 103 and has the cam member 105 secured thereto. The outer ends of the star 104 carry the cam rollers 106 which roll upon the cam lifts of the cam disk 101. The outer ends of the arms of the star 104 are adapted to be engaged by the downwardly extending lug 85 of arm 84 of lever 80. The cam 105 is provided with the outwardly directed portion 107 which is yieldable and resilient. Fixedly secured to the cam member is the stop lug 108.

The spindle 17 is further provided with the worm gear 109 which serves to drive the interrupted gear 110 carried by the repeat shaft 111. The control disk 112 is carried by the shaft 111 and is provided with a stop lug 113 which engages the lever 114 pivoted upon stud 66. The spring 115 serves to normally maintain the lever 114 in engagement with the disk 112. The lever 114 is provided with the second arm 116, the end of which is in a position to be engaged by the downwardly extending lug 57 carried by stop lever 56. The shaft 111 is provided with the radial stud 117 which engages the spring 118 when the lever 114 engages lug 113. The outer end of the shaft 118 carries the repeat lift cam 119.

Figure 2:
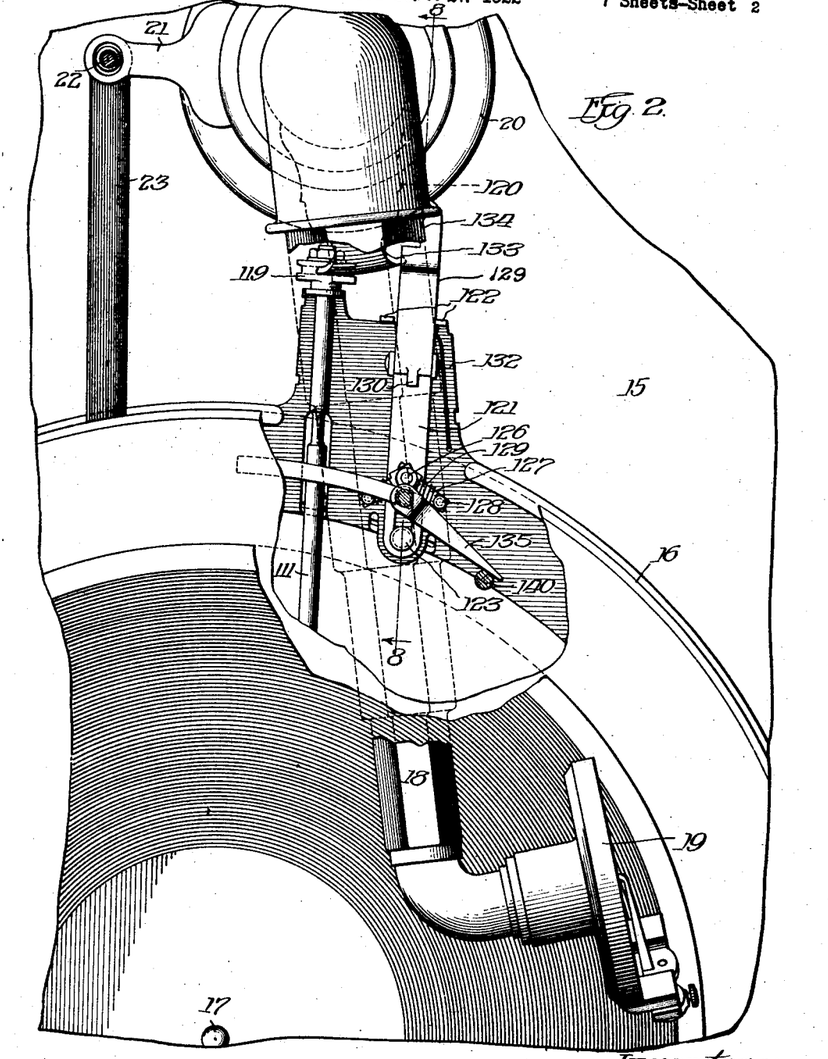
Figure 2 is a view on an enlarged scale showing the repeat mechanism.
Figure 8:
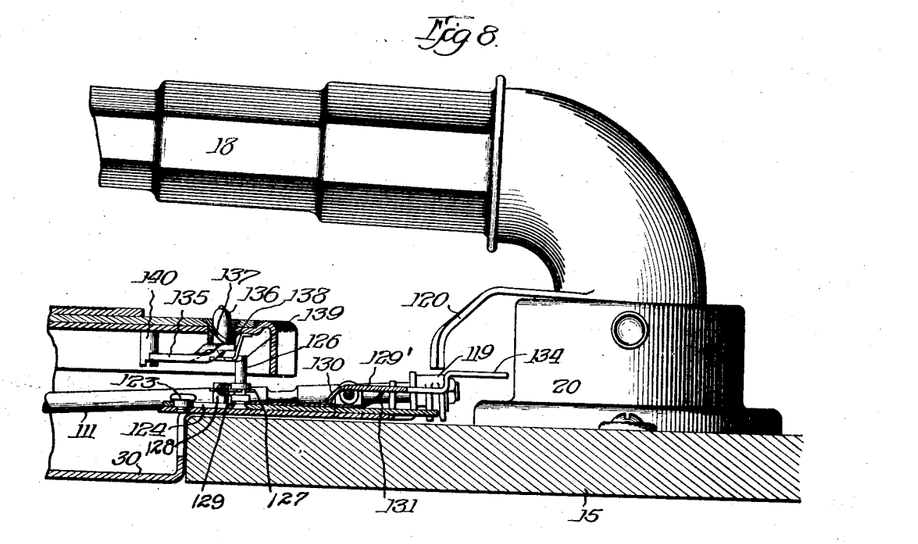
Figure 8 is a section taken on line 8—8 of Figure 2.
Figure 9:
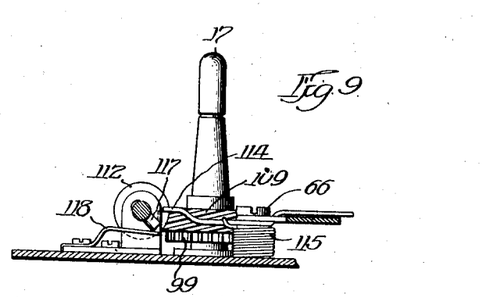
Figure 9 is a section taken on line 9—9 of Figure 4.

As best shown in Figures 2 and 8, the tone-arm is provided with the lifting arm 120 adapted to engage the lift cam. The limiting slide 121 is guided between lugs 122 and stud 123 fitting in slot 124. This slide carries the operating stud 126 which is engaged by the stud forks 127, the opposite ends of which engage the fixed studs 128. The forks 127 are each encircled by a spring 129. The slide 121 carries the stop arm 129' pivoted thereto. The finger 130 limits the upward movement of the member 129' while the spring 131 urges it upwardly. The spring 132 urges the slide laterally against the left stop 122 as shown in Figure 2. The member 129' is provided with the two stop surfaces 133 and 134. The travel adjusting lever 135 is carried by the plunger 136 provided with the spiral cut 137 (see Fig. 8). The plunger 136 is carried by the turntable and the lug 138 fits in the spiral and serves to rotate the member when it is pressed downwardly against the resistance of the spring 139. Inward movement of the lever 135 is stopped by stud 140. The lever 135 is in a plane such as to cause it to engage the stud 126.

Figure 4:
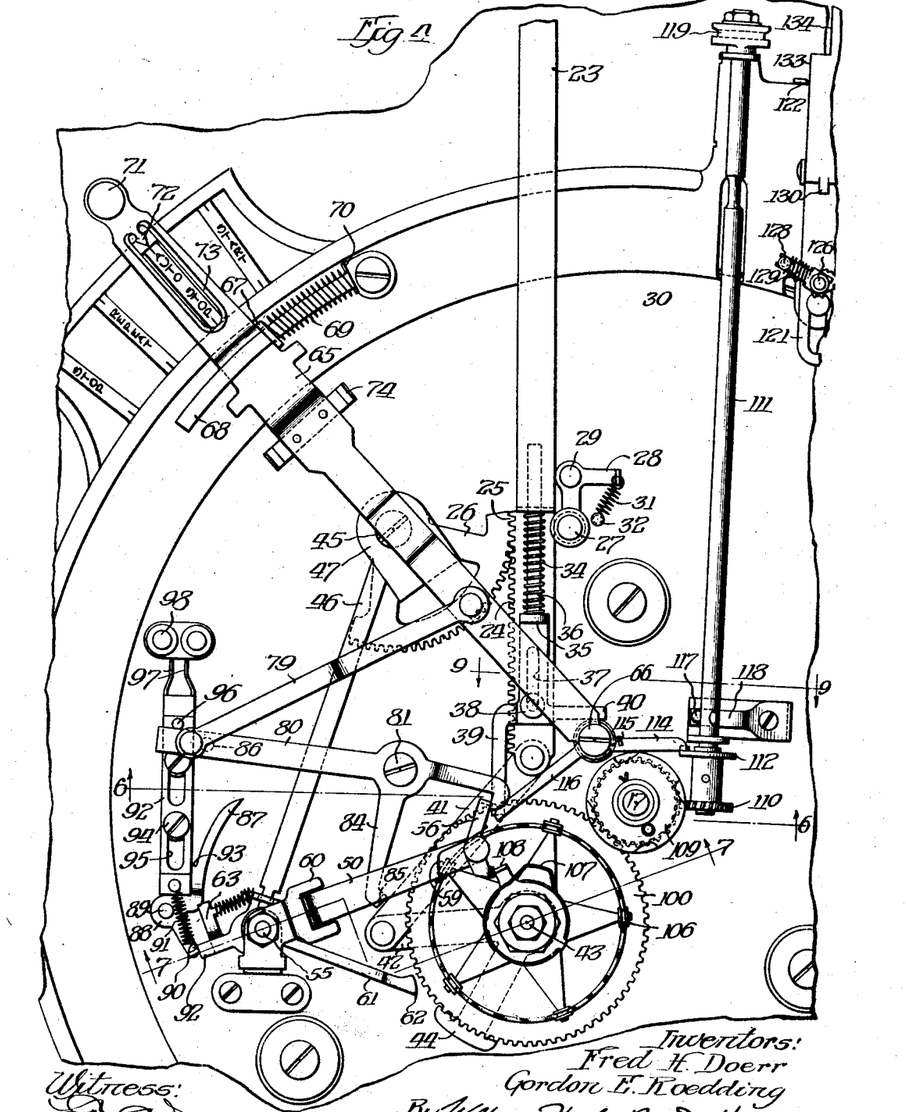
Figure 4 is a view similar to Figure 3 but showing the mechanism in the automatic stop position.

In the operation of the apparatus, a record is placed on the turn-table and a stylus inserted in the stylus holder upon the sound box, in the usual manner. At this time the control lever 65 will normally be in the "auto-stop" position with the parts as shown in Figure 4.

To start the machine the control lever is moved to the "start" position bringing the starting and switch mechanism to the position in which they are shown in Figure 3. During this movement of the control lever, the lever 80 is rotated in the clockwise direction and its outer end engages the stud 96 and moves the switch slide until the blades 97 engage the contacts 98. This contact closes the circuit of the motor which rotates the turn-table spindle 17. The notch 93 of the switch catch 88 engages and holds the switch slide in the closed position.

Simultaneously the arm 82 of the lever 80 engages the downwardly extending portion 57 of the stop lever 56 and thrusts the lever in such manner as to move the slide 50 in the clockwise direction sufficiently so that the downwardly extending portion 58 of the stop lever 56 is disengaged from the stop lug 108. The motor starts to rotate the spindle 17 and rotates the turn-table and also the gears 99 and 100 together with the assembly carried by gear 100.

Figure 12:
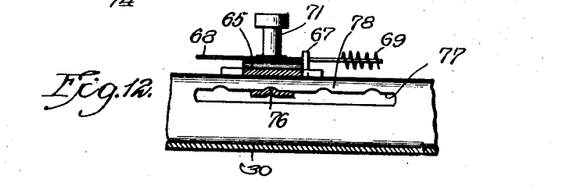
Figure 12 is a fragmentary section taken on line 12—12 of Figure 5.

After being moved to the "start" position, the control lever 65 is released and is moved to the "auto-stop" position by the force of the spring 69. The spring 74 forces the lug 76 into the notch 78 (see Fig. 12) under the "auto-stop" position and the control lever is thus automatically, yieldingly retained at that point.

The tone-arm is now manually lifted and the stylus placed in the outer end of the record groove in the usual manner. The engagement of the stylus with the spiral record groove causes the tone-arm to gradually and continuously swing inwardly. As the tone-arm swings inwardly the operating bar 23 is drawn outwardly.

Outward movement of the bar 23 rotates the sector 26 in the counter-clockwise direction. Due to its frictional engagement with the sector 26 the friction arm 46 is also swung in the counter-clockwise direction. The reduced outer end 48 of the friction arm 46 engages the lug 49 on the stop slide 50 and therefore rotates the stop slide assembly in the clockwise direction. Due to the relative lengths of the friction arm and the radius of the sector 25 and the relative distance between the lug 49 and the center of rotation of the stop slide and the end of the slide and its center of rotation, the movement of the end of the slide carrying the stop lever 56 is greatly increased over the small inward movement of the tone-arm.

Clockwise movement of the slide 50 is limited by the lower arm of the fork 60, and when the slide engages this arm of the fork, the lug 58 on the stop lever 56 is substantially in engagement with the cam 105. The gear 100 and consequently the cam 105, move in the counter-clockwise direction and the portion 107 of the cam thrusts the stop lever 56, and consequently the slide 50, in a counter-clockwise direction. This movement is transmitted to the friction arm 46 and its frictional connection with the sector 26 permit the arm to move relative to the sector. So long as the tone-arm continues to move inwardly, its movement, transmitted in the manner stated, will move the lug 58 out of the path of the stop lug 108 before the gear 100 completes a revolution. The cam 107 restores it to the path of the lug 108 immediately after the lug has passed.

With the control lever 65 in the "auto-stop" position, when the stylus reaches the inner end of the record groove and no longer swings the tone-arm, the machine will be automatically stopped, the stopping mechanism being brought to the position in which it is shown in Figure 4. The lug 58 on the stop lever after being thrust into the path of the lug 108 remains in that path until the lug 108 completes its rotation and thrusts against the lug 58. This thrust rotates the stop lever 56 about its pivot and the lug 57 thrusts against the hook 83 so that the stop slide 50 is thrust to the left as seen in Figure 4. The end 52 of the slide engages the lug 90 on the switch catch 88 and rotates the catch until the notch 93 is disengaged from the switch slide which latter is drawn to the open position by the spring 91. This cuts off the current to the motor.

The engagement of the stop lug 108 with the lug 58 further positively stops the rotation of the resistance star 104 which is rigidly connected to the lug 108. The rollers 106 roll up the cam rises on the member 101 and this movement is resisted by the resilience of the arms of the star. This resistance serves to effectively stop the rotation of the turn-table without sudden jar.

On machines operated by a spring motor, the switch and switch catch will be eliminated and the resistance mechanism will alone suffice to stop the motor.

While the explanation given above related to the stopping of the motor when the tone-arm stops its swinging movement at the end of a record, the stop will operate in the same manner if the sound box is swung away from the record and placed on its rest, the control lever being in the "autostop" position.

In placing the stylus upon the record, the tone-arm is often momentarily held still and it is obviously undesirable to have the stop function due to this cessation of swinging movement of the tone-arm.

The parts are so related that when the tone-arm is above the outer portion of a record, the cam 44 engages the portion 62 of arm 61 and swings the arm a short distance in the clockwise direction. This movement of the arm 61 disengages the upwardly extending portion 63 from its engagement with the rear extension 52 of the slide 50. It further compresses the spring 54 against the lug 49. The thrust of this spring swings the slide 50 in the clockwise direction as soon as lug 58 clears the cam 107 and prevents it from engaging the lug 108, regardless of movement transmitted through the friction arm 46. The cam 44 is of such an extent as to cover the outer edge of both small and large records.

When the cam 44 is out of engagement with the arm 61, the portion 63 of the arm engages the rear extension 52 of the slide and the two swing as a unit about the pivot 55, the spring 54 having no effect on their movement. This spring has the further function, however, of resisting the longitudinal movement of the slide 50 under stopping thrust, and of restoring it to normal position when the thrust is relieved.

Figure 5:
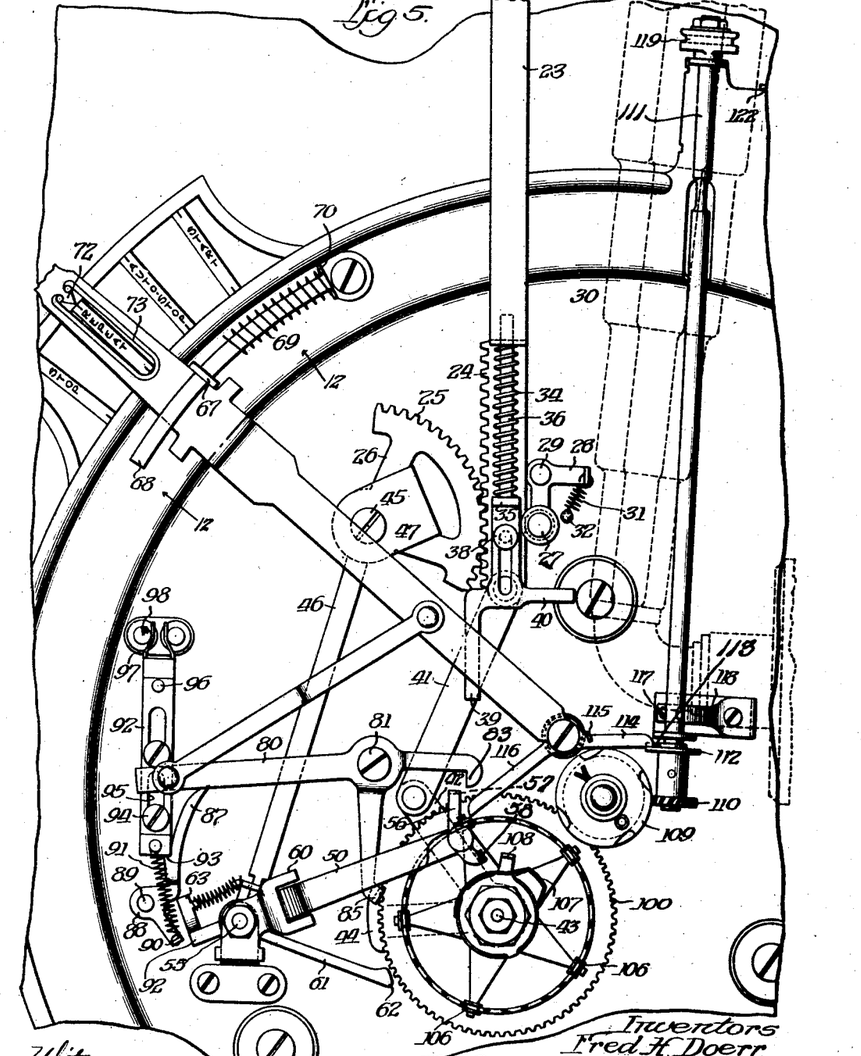
Figure 5 is a view similar to Figure 3 showing the mechanism in the repeat position.

When the control lever 65 is moved to the "repeat" position, the hook 83 is moved to such position that it cannot be engaged by the lug 57 as is clearly shown in Figure 5. Consequently the machine is not stopped when the lugs 108 and 58 engage. Instead, the lug 57 engages arm 116 and rotates the bell-crank against the resistance of spring 115 until the arm 114 clears the lug 113. The spring 118 pressing against stud 117 rotates the shaft 111 until the interrupted gear 110 engages the worm gear 109 which rotates the shaft through a complete revolution until the lug 113 again engages arm 114, at which time the interrupted portion of the gear will again be opposite the worm gear. It will be noted that when the lug 57 engages arm 116, the movement of arm 116 will permit the lever 56 to rotate sufficiently for the lug 58 to clear lug 108 so that the rotation of the turn-table is not stopped nor is the slide 50 thrust to the left.

As the shaft 111 rotates, the lift cam 119 engages the lifting arm 120 and lifts the tone-arm and causes it to swing in the counter-clockwise direction until the edge of the lifting arm 120 engages the abutment edge 133 or 134 as the case may be. This engagement stops the swinging movement of the tone-arm and as the cam 119 completes its rotation, the arm is lowered until the stylus engages the outer edge of the record. The lateral thrust due to the lifting cam causes the abutment member 121 to be swung to the right as seen in Figure 2 until it engages the stop 122, the movement being resisted by spring 132. As the stylus engages the record and the cam 119 disengages from the arm, the thrust of the spring 132 carries the stylus into the sound groove of the record.

If the slide 121 is in its outer position, the lifting arm will engage the stop 133 and the stylus will be stopped over the outer edge of a ten-inch record. If the slide is in its inner position, the lifting arm will engage the stop 134 and the stylus will be lowered onto the outer edge of a twelve-inch record. Movement of the slide is automatically governed by the record upon the turn-table. The adjusting lever 135 is shown in Figures 2 and 3 in its normal position. In this position, if the slide were at its inner position, the lever 135 would engage stud 126 and move the slide outwardly until the springs and forks 127 and 129 are past their centers, when the springs will carry the slide to its outer limit. The machine will then properly repeat a ten-inch record.

If a twelve-inch record is placed on the turn-table the weight of the record depresses plunger 136 and the cam groove 137 and lug 138 cause the lever 135 to be swung until its free end is adjacent the rim of the turn-table. The lever 135 will then engage the outer side of stud 126 and move the slide so that it will be carried to its inner position and yieldingly held there by the springs 129. The tone-arm will then be stopped at the proper position to repeat a twelve-inch record.

The stop arm 129' supported by spring 131 permits the tone-arm to be lowered to place the sound box on the rest beside the turn-table when the lifting arm 120 is above the arm 129'. The arm 120 clears arm 129' when the tone-arm is lifted in normally removing the point of the stylus from the record.

If the tone-arm be swung out and the sound box placed upon the rest 141 while the control lever is in the "repeat" position, the machine will be automatically stopped. This will be accomplished by the finger 39 serving to engage the lug 57 as it is engaged by hook 83 when the control lever is in the "auto-stop" position. The stop mechanism operates otherwise in the same manner. The inward movement of the finger 39 is limited by the engagement of the finger 40 with the stud 66. The yielding support of the fingers by the bar 23 permits the finger 39 to be properly located to operate the stop mechanism when the sound box is beyond the edge of the turn-table, regardless of its exact position on the sound box rest.

The machine may be stopped instantly at any time by moving the control lever 65 to the "stop" position. The stud 86 on lever 80 engages the arm 87 of the switch catch 88 and swings the switch catch to release the switch. Simultaneously the lug 85 on arm 84 is interposed in the path of the outer ends of the arms of the resistance star 104 and engages one of them to interpose the resistance and stop the rotation of the turn-table.

Our invention has been described in connection with an electrically operated machine. It will be noted, however, that the repeat mechanism is entirely independent of the source of the power applied to the turn-table spindle. Further, it will be noted that in each case when the machine is stopped, not only is the switch opened but a resistance is interposed against the rotation of the turn-table so that the device may be readily adapted to a spring motor machine by simply eliminating the switch and switch operating levers.

We claim:

1. The combination with a motor and a moving member, stop mechanism serving to stop the motor upon cessation of movement by the member, a control lever for said stop mechanism, and mechanism associated with the stop control and stop mechanism whereby movement of the control lever to a predetermined position serves to disengage the stop mechanism and permit starting of the motor.

2. In combination with an electric motor and a moving member, a switch for the motor circuit, means adapted to open said switch upon cessation of the movement of the member, and means adapted to interpose a resistance to rotation of said motor upon cessation of the movement of the member.

3. In combination with an electric motor and a moving member, a switch for the motor circuit, means adapted to open said switch upon cessation of the movement of the member, means adapted to interpose a resistance to rotation of said motor upon cessation of the movement of the member, and a control lever for both said means adapted by movement to one position to close said switch, and by movement to another position to prevent operation of both said means.

4. In combination with an electric motor and a moving member, a switch for the motor circuit, means adapted to open said switch upon cessation of the movement of the member, means adapted to interpose a resistance to rotation of said motor upon cessation of the movement of the member, and a control lever for both said means adapted by movement to one position to close said switch, by movement to another position to prevent operation of both said means, and by movement to a third position at any time during the operation of the apparatus to open the switch and interpose the resistance upon the motor.

5. In combination with an electric motor and a traversing member, a switch for said motor circuit, a catch for said switch, a stop slide operated by the traversing member, a stop lug moved by said motor, and means whereby the stop lug engages the stop slide upon cessation of movement by the traversing member and moves the slide into engagement with the switch catch whereby the switch is opened.

6. In combination with an electric motor and a traversing member, a switch for said motor circuit, a catch for said switch, a stop slide operated by the traversing member, a stop lug moved by said motor, means whereby the stop lug engages the stop slide upon cessation of movement by the traversing member and moves the slide into engagement with the switch catch whereby the switch is opened, and a connection between the stop lug and the motor whereby the engagement of the stop with the slide, stops the rotation of the motor.

7. In combination with a motor and a traversing member, two members mounted upon a common axis, a rigid drive connection between the first member and the motor, a series of cams carried by the first member, the second member having resilient arms carrying rollers engaging the cams, the engagement of the rollers and cams forming a yielding drive connection between the two members, and means adapted to positively stop movement of the second member upon cessation of movement by the traversing member.

8. In combination with sound reproducing apparatus comprising a turn-table, means for rotating the table, and a tone-arm carrying a stylus adapted to engage a record carried by the turn-table, means operated by the cessation of movement by the tone-arm adapted to lift the tone-arm, traverse it and lower the tone-arm until the stylus engages the record, and stop means adapted to limit the outward traverse of the tone-arm, said stop means being adjustable whereby the traverse may be adapted to records of different sizes, and means adapted to automatically adjust the stop to correspond with the record placed upon the turntable.

9. In combination with sound reproducing apparatus comprising a turn-table, means for rotating the table, and a tone-arm carrying a stylus adapted to engage a record carried by the turn-table, means operated by the cessation of movement by the tone-arm adapted to lift the tone-arm, traverse it and lower the tone-arm until the stylus engages the record, and stop means adapted to limit the outward traverse of the tone-arm, said stop means being adjustable whereby the traverse may be adapted to records of different sizes, and means carried by the turn-table adapted to automatically adjust the stop to correspond with the record placed upon the turn-table.

10. In combination with sound reproducing apparatus comprising a turn-table, means for rotating the table, and a tone-arm carrying a stylus adapted to engage a record carried by the turn-table, means operated by the cessation of movement by the tone-arm adapted to lift the tone-arm, traverse it and lower the tone-arm until the stylus engages the record, and stop means adapted to limit the outward traverse of the tone-arm, said stop means having two positions, one adapted to limit movement of the tone-arm to correspond to small records and one to large records, and means adapted to automatically place the stop in the first position when a record on the turn-table is below a predetermined size, and to move it to the second position when said record is above the predetermined size.

11. In combination with sound reproducing apparatus comprising a turn-table, means for rotating the table, and a tone-arm carrying a stylus adapted to engage a record carried by the turn-table, means operated by the cessation of movement by the tone-arm adapted to lift the tone-arm, traverse it and lower the tone-arm until the stylus engages the record, and stop means adapted to limit the outward traverse of the tone-arm, said stop means having two positions, one adapted to limit movement of the tone-arm to correspond to small records and one to large records, and means adapted to automatically place the stop in the first position when a record on the turn-table is below a predetermined size, and means carried by the turn-table and operated by placing a record thereon adapted to move the stop to the second position when said record is above the predetermined size.

12. In combination with sound reproducing apparatus comprising a turn-table, means for rotating the table, and a tone-arm carrying a stylus adapted to engage a record carried by the turn-table, means operated by the cessation of movement by the tone-arm adapted to lift the tone-arm, traverse it and lower the tone-arm until the stylus engages the record, and stop means adapted to limit the outward traverse of the tone-arm, said stop means having two positions, one adapted to limit movement of the tone-arm to correspond to small records and one to large records, and means adapted to automatically place the stop in the first position when a record on the turn-table is below a predetermined size, and when there is no record on the turn-table, and to move it to the second position when said record is above the predetermined size.

13. In combination with sound reproducing apparatus comprising a turn-table, means for rotating the table, and a tone-arm carrying a stylus adapted to engage a record carried by the turn-table, an adjustable stop adapted to limit outward movement of the tone-arm, a lug carried by the stop and an adjustable cam carried by the turn-table, the cam in its normal position being adapted to engage the lug to move the stop to one adjusted position, a stud connected to the cam and projecting above the turn-table whereby it may be engaged and depressed by a record of predetermined size placed upon the turn-table, depression of said stud serving to change the position of said cam, the cam in the changed position serving to engage the stud carried by the stop to move it to a second adjusted position.

14. In combination with sound reproducing apparatus comprising a turn-table, means for rotating the table, and a tone-arm carrying a stylus adapted to engage a record carried by the turn-table, an adjustable stop adapted to limit outward movement of the tone-arm, a lug carried by the stop and an adjustable cam carried by the turn-table, the cam in its normal position being adapted to engage the lug to move the stop to one adjusted position, a stud connected to the cam and projecting above the turn-table whereby it may be engaged and depressed by a record of predetermined size placed upon the turn-table, depression of said stud serving to change the position of said cam, the cam in the changed position serving to engage the stud carried by the stop to move it to a second adjusted position, and means adapted to restore the cam to its normal position upon removal of the record from the turn-table.

15. In combination with sound reproducing apparatus comprising a turn-table, means for rotating the table, and a tone-arm carrying a stylus adapted to engage a record carried by the turn-table, a lifting arm connected to the tone-arm, a gear driven by the turn-table spindle, a shaft carrying an interrupted gear adapted to mesh with the spindle gear, a cam on said shaft adapted to engage the lifting arm to lift, traverse and lower the tone-arm when said shaft is rotated, and means adapted to cause the interrupted gear to mesh with the spindle gear.

16. In combination with sound reproducing apparatus comprising a turn-table, means for rotating the table, and a tone-arm carrying a stylus adapted to engage a record carried by the turn-table, a lifting arm connected to the tone-arm, a gear driven by the turn-table spindle, a shaft carrying an interrupted gear adapted to mesh with the spindle gear, a cam on said shaft adapted to engage the lifting arm to lift, traverse and lower the tone-arm when said shaft is rotated, and means automatically operated upon cessation of inward traverse of the tone-arm adapted to cause the interrupted gear to mesh with the spindle gear.

17. In combination with sound reproducing apparatus comprising a turn-table, means for rotating the table, and a tone-arm carrying a stylus adapted to engage a record carried by the turn-table, a lifting arm connected to the tone-arm, a gear driven by the turn-table spindle, a shaft carrying an interrupted gear adapted to mesh with the spindle gear, a cam on said shaft adapted to engage the lifting arm to lift, traverse and lower the tone-arm when said shaft is rotated, a detent carried by the shaft, a lever engaging the detent, means adapted to disengage the lever from the detent, and means adapted to rotate the shaft to cause the interrupted gear to mesh with the spindle gear when the detent is released.

18. In combination with sound reproducing apparatus comprising a turn-table, means for rotating the table, and a tone-arm carrying a stylus adapted to engage a record carried by the turn-table, a lifting arm connected to the tone-arm, a gear driven by the turn-table spindle, a shaft carrying an interrupted gear adapted to mesh with the spindle gear, a cam on said shaft adapted to engage the lifting arm to lift, traverse and lower the tone-arm when said shaft is rotated, a detent carried by the shaft, a lever engaging the detent, means adapted to disengage the lever from the detent upon cessation of inward movement of the tone-arm, and means adapted to rotate the shaft to cause the interrupted gear to mesh with the spindle gear when the detent is released.

19. In combination with sound reproducing apparatus comprising a turn-table, means for rotating the table, and a tone-arm carrying a stylus adapted to engage a record carried by the turn-table, a lifting arm connected to the tone-arm, a gear driven by the turn-table spindle, a shaft carrying an interrupted gear adapted to mesh with the spindle gear, a cam on said shaft adapted to engage the lifting arm to lift, traverse and lower the tone-arm when said shaft is rotated, a detent carried by the shaft, a lever engaging the detent, means adapted to disengage the lever from the detent upon cessation of inward movement of the tone-arm, and a spring engaging a stud carried by the shaft and adapted to rotate the shaft to cause the interrupted gear to mesh with the spindle gear when the detent is released.

Signed at Grand Rapids, Michigan, this 20th day of Sept., 1922.

FRED H. DOERR.
GORDON E. ROEDDING.